United States Patent
Ji et al.

(10) Patent No.: US 9,059,888 B2
(45) Date of Patent: Jun. 16, 2015

(54) MIMO-OFDM-BASED FLEXIBLE RATE INTRA-DATA CENTER NETWORK

(71) Applicant: NEC Laboratories America, Inc., Princeton, NJ (US)

(72) Inventors: Philip Nan Ji, Plainsboro, NJ (US); Ting Wang, West Windsor, NJ (US); Yoshiaki Aono, Tokyo (JP)

( * ) Notice: Subject to any disclaimer, the term of this patent is extended or adjusted under 35 U.S.C. 154(b) by 66 days.

(21) Appl. No.: 13/767,181

(22) Filed: Feb. 14, 2013

(65) Prior Publication Data

US 2014/0056371 A1 Feb. 27, 2014

Related U.S. Application Data

(60) Provisional application No. 61/599,611, filed on Feb. 16, 2012.

(51) Int. Cl.
 *H04J 14/00* (2006.01)
 *H04K 1/10* (2006.01)
 *H04L 27/28* (2006.01)
 *H04L 27/26* (2006.01)
 *H04Q 11/00* (2006.01)

(52) U.S. Cl.
 CPC ........ *H04L 27/2697* (2013.01); *H04L 27/2649* (2013.01); *H04Q 2011/0032* (2013.01)

(58) Field of Classification Search
 None
 See application file for complete search history.

(56) References Cited

U.S. PATENT DOCUMENTS

| | | | | |
|---|---|---|---|---|
| 2003/0090763 | A1* | 5/2003 | Yang et al. | 359/130 |
| 2007/0116468 | A1* | 5/2007 | Ji et al. | 398/79 |
| 2009/0097852 | A1* | 4/2009 | Qian et al. | 398/89 |
| 2011/0087799 | A1* | 4/2011 | Padhye et al. | 709/235 |

OTHER PUBLICATIONS

OFDM Signals in WDM Radio-Over-Fiber Networks with Fiber Bragg Grating Selection Diogo Coelho, Henrique M. Salgado, 2009, IEEE.*

* cited by examiner

*Primary Examiner* — Shi K Li
*Assistant Examiner* — Mina Shalaby
(74) *Attorney, Agent, or Firm* — Joseph Kolodka

(57) ABSTRACT

An optical network includes receiving inter-rack traffics from transmitter racks, converting by transmitters the inter-rack traffics to respective wavelength division multiplexing WDM optical signals, receiving and routing by a cyclic interleaver the optical signals from the transmitters to output ports in a cyclic manner, converting respective routed optical signals from the cyclic interleaver into respective electrical signals, and demodulating OFDM formats from respective converted optical signals containing signals for respective receiver racks.

16 Claims, 5 Drawing Sheets

MIMO-OFDM-BASED FLEXIBLE RATE INTRA-DATA CENTER NETWORK

RELATED APPLICATION INFORMATION

This application claims priority to provisional application No. 61/599,611 filed Feb. 16, 2012, the contents thereof are incorporated herein by reference

BACKGROUND OF THE INVENTION

The present invention relates generally to optical networks, and more particularly, to multiple-in-multiple-out orthogonal frequency division multiplexing MIMO-OFDM based flexible rate intra-data center network.

The global Internet traffic is growing rapidly. Many of the Internet applications are hosted in the data center servers (such as cloud computing application, search engine, etc.) and are data-intensive and require large degree of interactions among the servers in the data center. (To distinguish from the communication network between different data centers (i.e. the "inter-data center network"), this network of interconnects among the servers in a data center is called the "intra-data center network". In some literatures, this is simply called "data center network".) In the intra-data center network, the traffics among these servers are usually dynamic in nature and often busty. Therefore the intra-data center networks are facing challenging demand such as high channel bandwidth, flexible bandwidth configuration, low latency, high network throughput. Also, current data centers rely on electronic router to perform these interconnection functions, this consumes large amount of power and generates large volume of heat, which in turn requires more power for cooling. Therefore the intra-data center network also needs to have low energy consumption and low heat dissipation. An efficient intra-data center network architecture and corresponding interconnection scheme is required to meet these challenges.

Fiber optic technology is a natural way to solve these problems, because optical fiber offers very large bandwidth (10 G, 40 G, 100 G per channel or beyond), comparing to copper-based technology or wireless technology. Applying optical communication technology to the data center network also makes it easier to interface with inter-data center networks which have much larger traffic volume and therefore have been mainly based on optical communications technologies. The cost of optical transmission medium, namely the optical fiber, is also low cost, especially for multi-mode fiber. Many optical devices are passive and do not consume electricity. Based on these reasons, it is beneficial to apply optical technology in intra-data center network.

However, currently the optical technology in the intra-data center application is only for point-to-point links, which utilizes only the advantage of large bandwidth. Such network lacks flexibility. The switching between different servers is still relying on electronic switch fabric. And it does not offer the capability to share the bandwidth as the traffic pattern changes.

In the intra-data center network, the servers (usually up to 48 in the form of blades) are accommodated into racks and are connected through a Top-of-the Rack Switch (ToR). These ToR switches are further inter-connected through one or multiple tiers of aggregate switch in a fat-tree topology and switched at the core switch. Since the traffics within a rack is relatively smaller and the servers are physically located closer (thus easier to interconnect), the focus of the intra-data center network is on how to efficiently switch among the ToRs, since the ToR, the aggregate switch and the core switch in this architecture have high power consumption and cause latency in the traffic. This is the main target for this invention.

In the past few years, the optical communication research community has proposed several architectures to make the optical interconnects in the intra-data center network more efficient. Each of them has its advantages and disadvantages. Below are the descriptions of these prior arts and some analysis.

a. c-Through Architecture (FIG. 1)

The c-Through architecture was proposed by researchers from Rice University, Carnegie Mellon University and Intel. It improves the current electrically switched intra-data center network by using a hybrid electrical-optical architecture, where the ToR switches are connected to both an electrical packet-based network and an optical circuit-based network. An optical circuit switch is used connect pairs of rack with high bandwidth demands. It requires a traffic monitoring system to collect the bandwidth requirements and to determine the configuration of the optical switch. This architecture reduces completion time and offers significantly reduced latency for those applications in which the traffic demand between some hosts changes slowly.

This architecture requires a large sale core optical circuit switch, which is costly and present a large single point-of-failure. It also does not offer bandwidth sharing capability (unless it is done through electrical switch). Having both electrical switching system and optical switching system makes the network larger and more costly. The switching speed in this architecture is at the order of milliseconds (ms).

b. Helios Architecture (FIG. 2)

The Helios architecture was proposed by UCSD. It is also a hybrid electrical/optical switch architecture. It has a layer of electrical switches as the ToR switches (also called pod switches), then another layer of core switch, which include some electrical packet switches for all-to-all communication of the pod switches, and some optical circuit switched for traffic with high bandwidth yet changes slowly. It uses WDM (wavelength division multiplexing) transceivers to multiplex multiple high bandwidth channels to form superlinks to be switched optically.

This architecture also has the disadvantages of requiring large scale optical circuit switch and not able to share optical bandwidth. The switching speed is also at the ms order.

c. Proteus Architecture (FIG. 3)

This architecture was proposed by NEC and UIUC. It uses direct optical connections between ToR switches for high-volume connections and uses multi-hop connections (also optical) for low volume traffic. In this architecture, each ToR switch has multiple optical transceivers operating at different wavelengths, therefore can deliver coarse-grain flexible bandwidth by installing different number of transceivers. It then uses WSS (wavelength-selective switch) to send these wavelengths to different input port of an optical switch matrix for optical layer switching. This architecture needs some algorithm to find the optimum configuration for the core optical switch.

This architecture also requires a large core optical switch. The switch scale is even larger than the previous 2 architectures, because it requires multiple ports for each ToR. This increases the switch scale by several folds. The addition of WSS also increases the hardware cost. Using commercially available devices (WSS and core optical switch), the switching speed of this architecture is also at the ms range.

Recently a research paper published by Columbia University, Cornell University and BUPT proposed to use cascaded silicon microring switches and SOA (semiconductor optical amplifier) switch fabric to realize such architecture. This will increase the switching speed to the nanosecond (ns) range and thus capable for packet switching. However this remains at lab prototype level and not yet feasible in commercial deployment.

d. DOS Architecture (FIG. 4)

The DOS (Datacenter Optical Switch) architecture was proposed by UC Davis. It uses a cyclic arrayed waveguide grating (CAWG, sometimes it is called an AWG router or AWGR, sometimes it is also called a cyclic interleaver) that allows contention resolution in the wavelength domain. The CAWG is a N×N cyclic multiplexer/demultiplexer that routes different wavelengths from different inputs to different output ports in a cyclic manner, as illustrated in FIG. 5 (1 8×8 CAWG). In the DOS architecture, a tunable wavelength converter (TWC) is placed at every ToR switch to assign the appropriate wavelength to the signal so that it can be routed to the target output port through the CAWG and then received. In case that the number of output receivers is fewer than the input ToR switches, a SDRAM buffer is used to store the transmitted packets temporarily. Since each of the CAWG output can receive signals from all inputs, this buffer can be shared among all input ToR switches.

An advantage of this architecture is that the latency is almost independent of the number of input ports and remains low even at high input loads (if signal is not buffered), and it does not require a large scale core fiber switch. A disadvantage is that it requires electrical buffer for congestion management. This OEO (optical-electrical-optical) scheme is power hungry and causes latency. Also, it uses TWC for wavelength tuning, which is quite costly. The switching speed depends on the performance of the TWC, which ranges from several ns (lab prototype) to ms level (commercial products).

Several other architectures also use CAWG and wavelength converter to form the optical core. The first one is the Petabit switch fabric proposed by Polytechnic Institute of NY. In this architecture, a three-stage Clos network is used and each stage consists of an array of CAWGs, and an array of tunable lasers and two arrays of TWCs are used for wavelength tuning (i.e. route switching). This architecture does not require electrical buffers inside the switch fabric, but instead use electronic buffers in the line cards and an efficient scheduling algorithm to perform congestion management. The disadvantages include the requirement of large quantities of TWCs, tunable lasers and CAWGs, which is very costly.

Another architecture that use CAWG and wavelength converter was proposed by Alcatel-Lucent in an IRIS Project. It is also based on a three-stage switch to provide dynamically non-blocking switching. This architecture also requires multiple CAWGs and multiple arrays of wavelength converters, which is very costly. Besides that, it require arrays of wavelength switches and different optical delay lines for time buffer, which adds the hardware cost even further. Also, this architecture does not provide sharing of bandwidth between ToRs.

e. Optical OFDM-Based Data Center Network (FIG. 6)

The feasibility of using optical OFDM (orthogonal frequency division multiplexing) technology for data center application has been considered, but no actual network architecture is proposed for the intra-data center network in this paper.

An optical OFDM-based data center network architecture was proposed by Athens Information Technology. This architecture has the similar architecture of a ROADM (reconfigurable optical add/drop multiplexer) node based on WSS and combiner. Optical OFDM (where the OFDM subcarriers are generated optically) transceivers are used to connect the ToR to the centralized WSS-based switch, where the subcarriers are routed to different ports based on the traffic requirements. This enables relatively fine level bandwidth sharing at each ToR (the reason why we say it's "relatively" fine level sharing is that the sharing is done at the optical subcarrier level, which typically has the resolution of 10 Gb/s or higher). At the output port of the switch, all of the subcarriers are multiplexed and forwarded to the OFDM receiver which retrieves the subcarriers and forwards the packets to the servers. An efficient bandwidth allocation algorithm is needed to take advantage of the flexibility and finer grain tunability of OFDM.

The disadvantages of this architecture include: (1) It requires a flexible grid WSS for each ToR, which is not commonly available, has limited granularity, has limited port count (commercial prototypes are up to 1×9, therefore cannot support the data center network which has typically 100s or 1000s of ToRs), and costly. (2) It requires guard bands between subcarrier bands for different output ports, which leads to less efficient spectrum utilization. (3) It requires multiple electrical-optical modulators at each ToR, because typically the optical OFDM requires one modulator for each OFDM subcarrier. (4) The granularity is still not fine enough for efficient flexible bandwidth sharing. (5) It requires either high port count optical coupler (large optical loss) or WSS (costly) at each receiver to multiplex the switched signals.

Accordingly, there is a need for a flexible rate intra-data center network that overcomes the deficiencies of prior efforts.

BRIEF SUMMARY OF THE INVENTION

The present invention is directed to a MIMO-OFDM based flexible rate intra-data center network including a transmitter top-of-the-rack TOR switches respectively coupled to transmitter servers to receive inter-rack traffics from transmitter racks, transmitters for converting the inter-rack traffics to respective wavelength division multiplexing WDM optical signals containing K wavelengths with K being a number of receiver racks that the optical signals from the transmitter racks are to travel to, an cyclic interleaver for receiving and routing said optical signals from the transmitter racks to output ports in a cyclic manner, photodetectors for converting respective routed the optical signals from the cyclic interleaver into respective electrical signals, and demodulators for demodulating OFDM formats from respective converted optical signals containing signals for respective receiver racks through respective receiver TOR switches.

In an alternative expression of the invention, a method by a MIMO-OFDM based flexible rate intra-data center network includes receiving inter-rack traffic from transmitter racks coupled to transmitter top-of-the-rack TOR switches respectively coupled to the transmitter; converting by transmitters the inter-rack traffics to respective wavelength division multiplexing WDM optical signals containing K wavelengths with K being a number of receiver racks that the optical signals from said transmitter racks travel to, receiving and routing by a cyclic interleaver the optical signals from the transmitter racks to output ports in a cyclic manner, converting respective routed the optical signals from the cyclic interleaver into respective electrical signals, and demodulating OFDM formats from respective converted optical signals containing signals for respective receiver racks through respective receiver TOR switches.

These and other advantages of the invention will be apparent to those of ordinary skill in the art by reference to the following detailed description and the accompanying drawings.

DETAILED DESCRIPTION

The present invention uses a "CAWG+electrical OFDM+ parallel signal detection" method to perform switching in the data center network. It has the benefit of optical layer switching (high bandwidth, low power consumption and heat dissipation). It combines the benefit of CAWG architecture, but not requiring TWC. By using electrical OFDM (instead of optical OFDM), the granularity for the bandwidth sharing is much finer. It also does not require WSS or optical core switch, and uses only a single receiver to receive multiple incoming signals (through the parallel signal detection technology), therefore reduces optical component cost, improves reliability, and allows fast switching/routing. It does not require electrical buffer.

Figure 1:
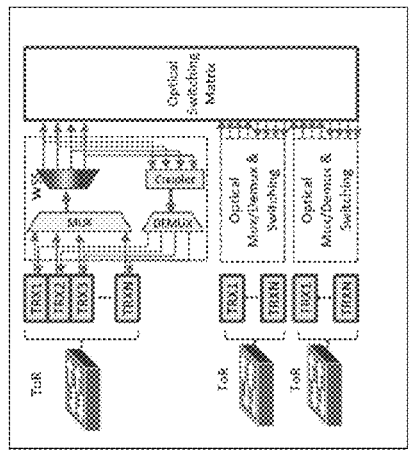
FIG. 1 is diagram of a known c-Through network.
Figure 3:
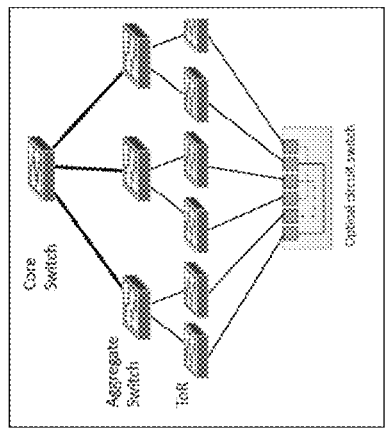
FIG. 3 is a diagram of a known Proteus network.
Figure 2:
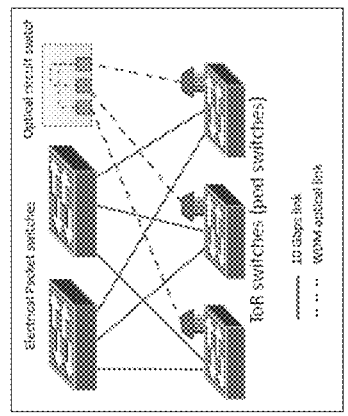
FIG. 2 is a diagram of a known Helios data center network.
Figure 4:
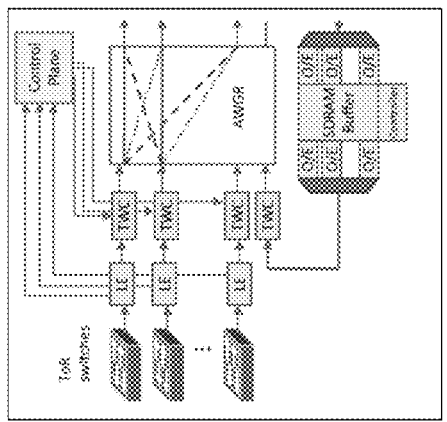
FIG. 4 is a diagram of a known datacenter optical switch DOS.
Figure 6:
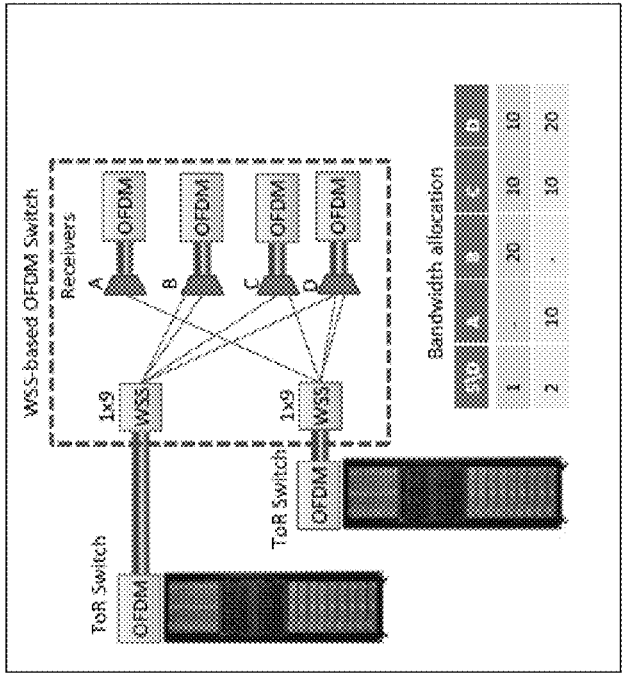
FIG. 6 is a diagram of a known optical OFDM-based data center network.
Figure 5:
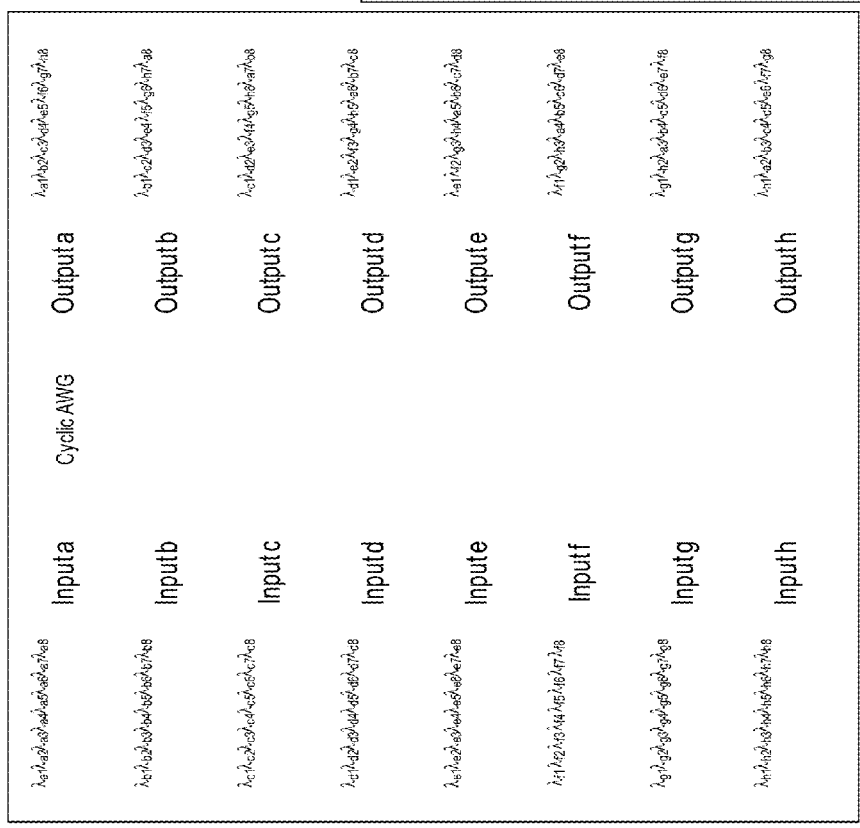
FIG. 5 is a diagram of a known 8×8 cyclic AWG multiplexer/demultiplexer.
Figure 7:
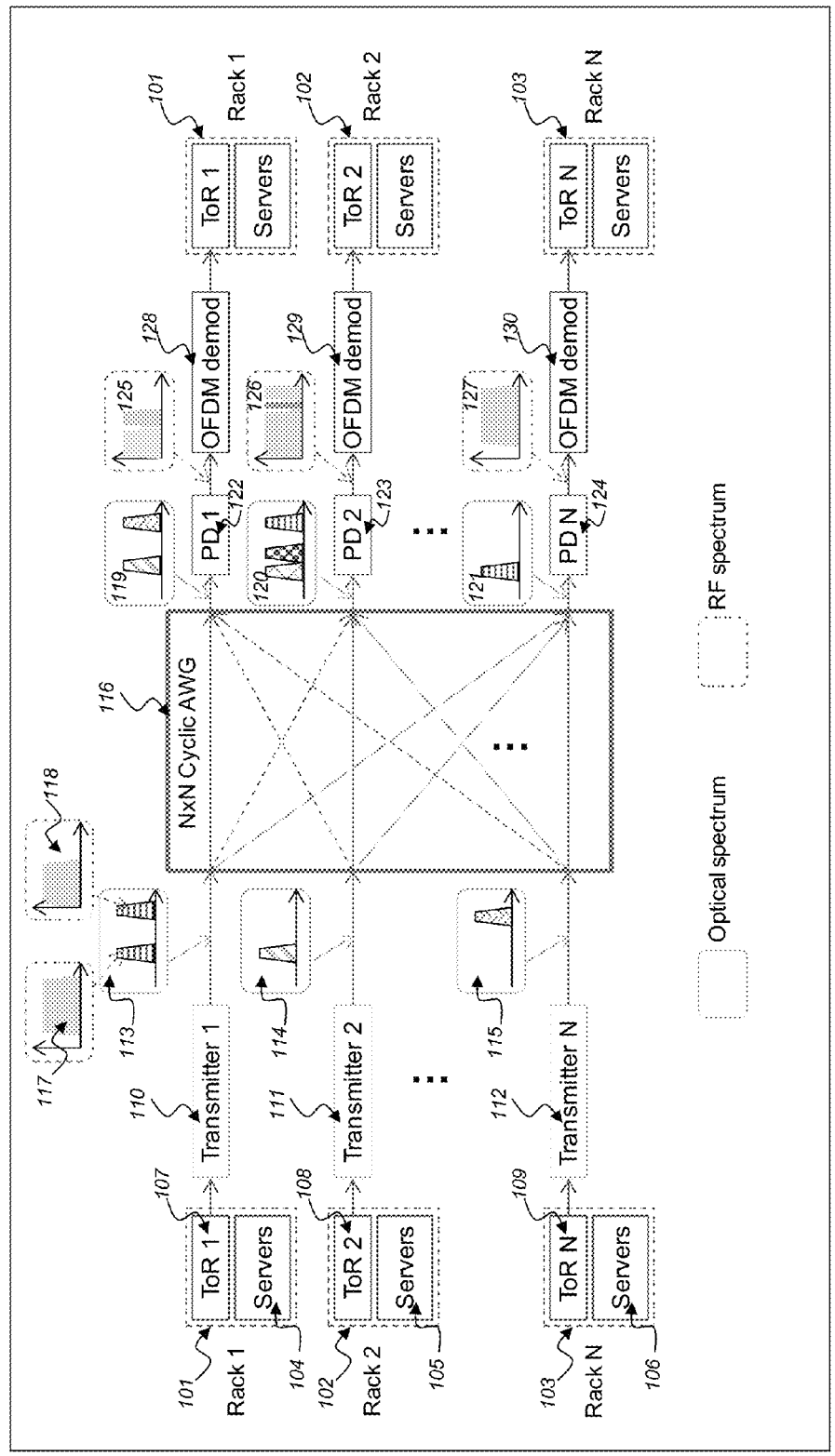
FIG. 7 is a diagram of an exemplary MIMO-OFDM flexible rate intra-data center network, in accordance with the invention.

Turning now to the block diagram of FIG. 1, showing aspects of load management and CO2 emission reduction for configuring second life battery energy storage FIG. 7 shows the schematic of the proposed MIMO OFDM flexible rate intra-data center network. In this example, there are N racks in this data center network. At each rack (101, 102, 103), the inter-rack traffics from the servers (104, 105, 106) in the rack are sent to the ToR switch (107, 108, 109), which is converted into optical signal by a WDM OFDM transmitter (110, 111, 112, to be discussed in more details later). The optical signal at the output of the transmitter is a WDM signal, which contains K wavelengths (as illustrated by the optical spectrum examples in 113, 114, 115). K is the number of destination racks that the signals from this source rack need to travel to, so 0<=K<=N. Different racks can have different K numbers. The channel spacing of WDM signal is the same as the channel spacing of the N×N cyclic AWG (116), such as 50 GHz, or 100 GHz, etc. (Note that this WDM system is a fixed grid WDM system. It does not require flexible WDM channel spacing, and thus can utilize mature optical components. Comparatively, the prior art uses flexible grid WDM system for flexible bandwidth sharing, which requires new generation flexible grid components that are not widely available and not mature.) The wavelength for each WDM channel at the transmitter output is determined by the destination of the respective signal, based on the wavelength routing table of the N×N CAWG.

Within the WDM signal (such as 113), each channel is modulated with respective OFDM signals, which have different numbers of subcarriers, as illustrated by the RF spectrum examples in 117 and 118 (for the 2 WDM channels in 113 respectively). There is no restriction for the OFDM signals generated from the same rack, they can have the same or overlapped RF spectrum, because they are independent to one another and do not interfere with one another. The subcarrier position and quantity for each WDM channel are determined by the centralized controller based on the required bandwidth of each signal sent to each output port. The OFDM signal modulated on each WDM wavelength can have non-consecutive subcarriers, and can have up to the maximum number of subcarriers allowed in the OFDM system.

The N×N CAWG receives WDM signals from the N transmitters of the N racks, and routes different wavelengths to different output ports in the cyclic manner (refer to the device description earlier). Each output port receives multiple WDM channels (optical spectra: 119, 120, 121). Due to the routing function of the CAWG, each output port can only have 1 or none WDM channel from each input port. These WDM signals are received by a single common photo-detector (122, 123, 124) to convert them into electrical signal (RF spectra: 125, 126, 127). This technology is called parallel signal detection or PSD, which has been applied in various WDM systems, including OFDM-based networks. By having appropriate spectrum and subcarrier assignment across this network, there will not be OFDM subcarrier contention among the WDM signals received at each receiver (such as in examples in 125 and 126). This received signal still has OFDM format, which is then demodulated into the original signal format (such as Ethernet packets) by the OFDM demodulator (128, 129, 130). The received signal contains the signals from all racks for this output rack, and is sent to the respective destination servers through the ToR at each rack. The racks (101', 102', 103') and the ToRs and servers inside the racks at the right side of this figure are the same as those on the left side. It's drawn this way to make the drawing clearer to view.

In this architecture, the signals from each rack can be switched to multiple racks simultaneously, and each rack can receive signals switched from multiple racks simultaneously, therefore it has the MIMO (multiple-in multiple-out) feature.

Figure 8:
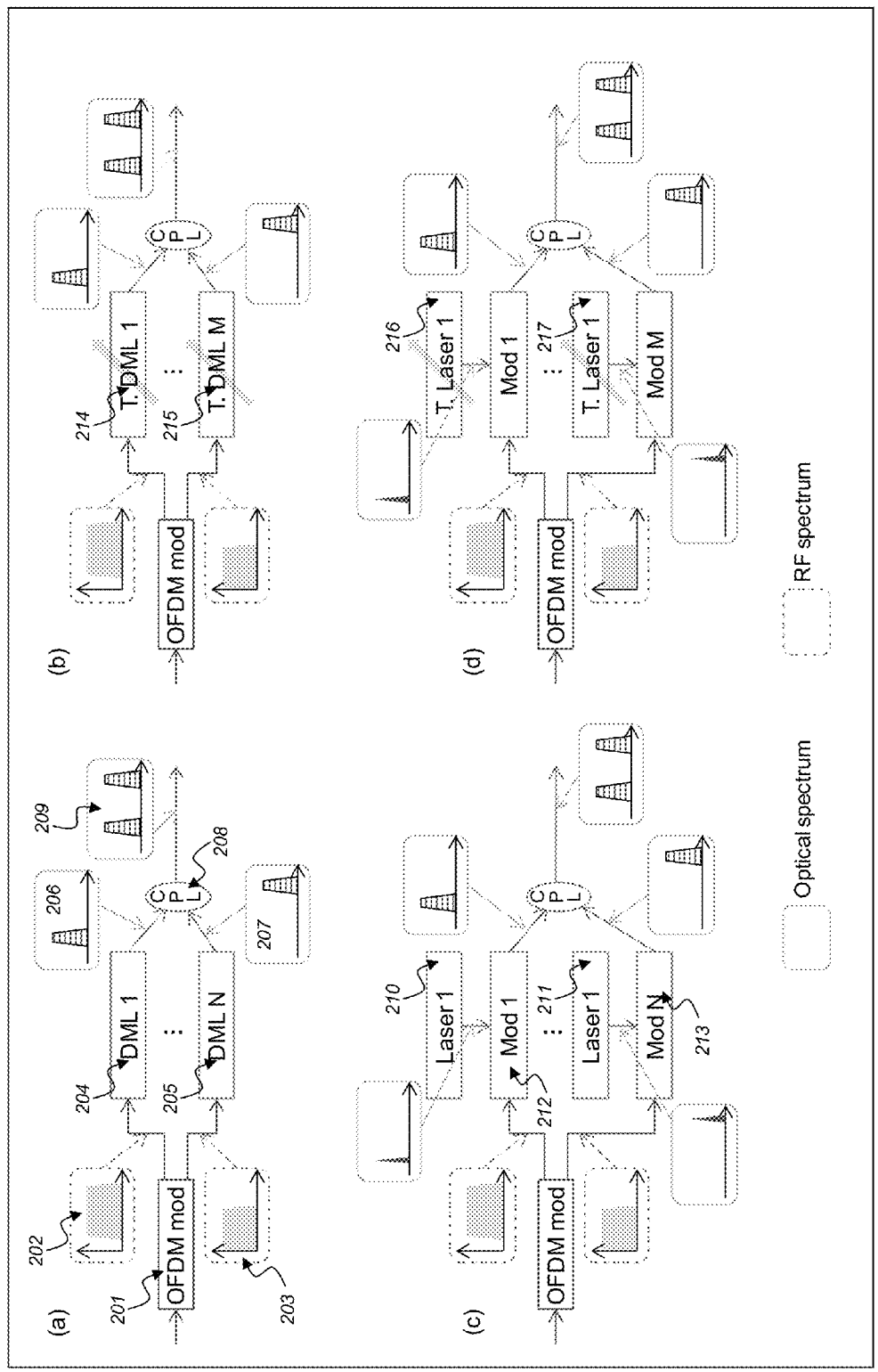
FIG. 8 shows diagrams of alternative configurations to achieve a WDM-OFDM transmitter.

FIG. 8 shows various options to realize the WDM OFDM transmitter (110, 111 and 112). In the first option (FIG. 8(a)), an OFDM modulator (201) receives the signals from the ToR (107, 108, 109), and converts them into up to N different streams of OFDM signals, one for each destination rack (if no loop back is required, this number can be reduced to N−1). All signals going to the same destination rack are modulated together into one OFDM signal. The subcarrier location and quantity are determined by the centralized controller using appropriate scheduling algorithm and wavelength and spectrum assignment algorithm to avoid subcarrier contention at the destination node, and to ensure best utilization of the bandwidth resource. There is no subcarrier assignment restriction among the OFDM signals generated by the same modulator (such as shown in the RF spectra 202 and 203). Each of the generated OFDM signal is modulated onto a directly modulation laser (DML) (204, 205) to convert into WDM optical signal (206, 207). These N DMLs have different wavelengths, based on the wavelength assignment of the CAWG (116). These N WDM signals are combined using a WDM multiplexer or an optical coupler (208) into a WDM output signal (209).

In the second option (FIG. 8(b)), each DML is replaced by a laser source (210, 211) with CW output and a modulator (212, 213), which can be an electrical-optical modulator, or an electro-absorption (EA) modulator, etc.

In the third option (FIG. 8(c)), the fixed wavelength DMLs in Option 1 are replaced with tunable DMLs (214, 215), which can select the output wavelength dynamically. Since usually the signal from each source rack only needs to be switched to smaller number of destination racks at each point of time, it might not be cost efficient to install N lasers (or N laser-modulator assemblies), especially when N is large. Using tunable lasers allows the sharing of optical sources and thus reduces hardware size and cost. Instead of N transmitters, only M tunable lasers are used in this option (M<N), and the coupler (208) cannot be replaced by a multiplexer since most optical multiplexers have fixed wavelength assignment, and bandwidth variable optical multiplexer is very costly to realize.

The fourth option is a combination of Option 2 and Option 3. It uses tunable lasers (216, 217) and modulators to generate the WDM OFDM signal (FIG. 8(d)).

When the switching state needs to be changed, the OFDM modulator at the respective racks change the generated OFDM signal based on the new switch configuration (determined by the centralized controller), and the WDM OFDM transmitter at these racks are reconfigured by turning lasers on and off or tuning the wavelengths of the tunable lasers. No change is required at the core N×N CAWG or at the receivers.

This architecture delivers fast switching speed. If the transmitter uses fixed wavelength laser (such as in Options 1 and 2), the optical switching speed is just the time to turn individual lasers one and off, which can be in the order of ns or shorter. If the transmitter uses tunable laser (such as in Options 3 and 4), the optical switching speed is determined by the laser tuning speed, which can range from ms level to ns level. Therefore packet level switching is achievable with this architecture.

In terms of the latency on the signal, this architecture offers very low latency, and the latency figures from all switched signals are uniform. This is because all switched signals take exactly one hop (i.e. going through the switch only once).

Since electrical OFDM is used in this architecture to carry the signal to be switched, the switching granularity is much finer than the current optical data center technologies (for example, in direct optical point-to-point link, the granularity is one fiber; in regular WDM system, the granularity is one WDM channel, which typically carries 10 Gb/s to 40 Gb/s or 100 Gb/s data; in the optical OFDM system, the granularity is one optical OFDM subcarrier, which is typically 10 Gb/s or higher). The switching granularity in the electrical OFDM system is one electrical OFDM subcarrier, which is typically in the order of 10s or 100s of Mb/s. Having finer granularity allows more flexible bandwidth allocation and more efficient spectrum utilization.

Also, when combing electrical OFDM signals from different sources at the PSD-based receiver, no guard band is required (unlike the optical OFDM technology). This allows maximum utilization of the full spectrum resource.

Besides the flexibility in selecting the number of OFDM subcarriers for each signal to be switched, OFDM also provides the capability to change the modulation order. For example, the electrical OFDM signal in each subcarrier can be modulated using BPSK, or QPSK, or 8QAM, or 16QAM, etc. This allows variable amount of data to be packed within the same subcarrier (or group of subcarriers), as these modulation formats contain different number of data bits in each symbol. Within the same OFDM signal, different modulation formats can coexist (different subcarriers can use different modulation formats).

Since this architecture uses N×N AWG to as the optical router, there will not be the problem of insufficient receiver. Therefore no electrical or optical buffer is needed, unlike in prior efforts. Also, the potential issue of congestion at certain destination rack can be solved by one or multiple of techniques, such as: (1) Use higher order modulation format to pack more signals within the spectrum; (2) Use electronic buffers in the line cards in the rack to do buffering; and (3) Use efficient scheduling algorithm to avoid congestion.

Besides having lower power consumption than electrical switch-based data center network (a typical benefit of using optical switching), the proposed architecture also has lower power consumption than other optical switching architectures. This is because among all the optical components used in this architecture, only the transmitters and the photodetectors require power, and these devices are common to all optical switching architectures. Besides these, the proposed architecture does not use any other optical devices that consume power (compared to WSS, TWC, core optical switch, etc. that are required in other architectures).

Figure 9:
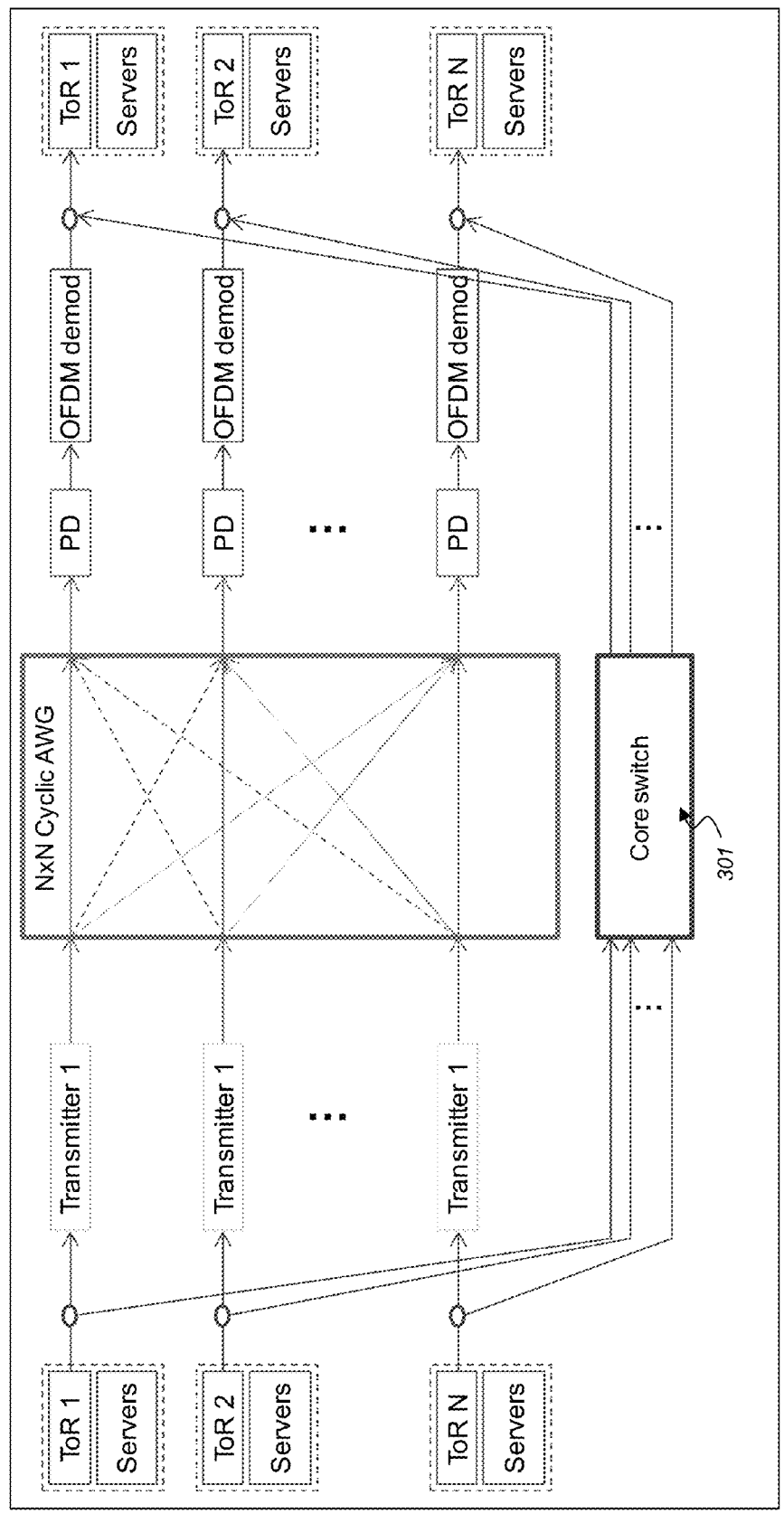
FIG. 9 is a diagram of a hybrid electrical/optical inra-data center network combining the inventive MIMO-OFDM-based flexible rate optical switching and electrical packet switching.

In case that some traffics require even lower latency or have volume so low that even the electrical OFDM's granularity is not fine enough, the proposed architecture can be modified to add a parallel layer of electrical switching. This hybrid electrical/optical switched intra-data center network architecture is shown on FIG. 9. Here the signal from each ToR is split into two paths, one goes through the optical switching route as described earlier, the other goes through a core electrical packet switch (301) for fast, short duration switching. The signals from these two paths are combined before entering the destination ToR. This architecture increases the cost, but can ensure lower latency for short duration traffics.

From the foregoing it can be appreciated that the features and benefits of the inventive MIMO-OFDM flexible rate intra-date center network includes: passive switching core: high reliability, low power consumption, low heat dissipation; single hop optical path: low and uniform latency; no switching at the receiver: lower cost, fast response; OFDM (electrical): flexible bandwidth, fine granularity, efficient spectrum resource sharing; flexible modulation format: can expand channel capacity; MIMO operation: single receiver can receive signal from multiple inputs (with appropriate subcarrier assignment), no electrical buffer needed; the signals from each rack (through the single ToR) can be sent to multiple receivers (depending on the number of DML); switching is done by turning corresponding lasers on and off (or laser tuning, in a design variation): faster switching than the current architectures that require WSS and FXC, can support packet switching, lower latency, less overhead; hybrid transparent and opaque architecture (in a design variation): ensure lower latency for short duration traffic; and can be realized using only commercially available devices (vs. research experiment or just on-paper proposal): Reliability, faster deployment.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A MIMO-OFDM based flexible rate intra-data center network comprising:
   transmitter top-of-the-rack TOR switches respectively coupled to transmitter servers to receive inter-rack traffics from transmitter racks for switching with Cyclic Arrayed Waveguide Grating (CAWG), electrical OFDM and parallel signal detection, wherein each transmitter output at the ToR is sent to multiple destinations at the same time, and each receiver receives signals from multiple source at the same time using only a single detector;

transmitters for converting said inter-rack traffics to respective wavelength division multiplexing WDM optical signals containing K wavelengths with K being a number of receiver racks that said optical signals from said transmitter racks are to travel to;

an cyclic interleaver for receiving and routing said optical signals from said transmitter racks to output ports in a cyclic manner;

photodetectors for converting respective routed said optical signals from said cyclic interleaver into respective electrical signals; and demodulators for demodulating OFDM formats from respective said converted optical signals containing signals for respective receiver racks through respective receiver TOR switches.

2. The network of claim 1, wherein a channel spacing of a said WDM optical signals is the same as a channel spacing of said cyclic interleaver.

3. The network of claim 1, wherein said network comprises a fixed grid WDM system that does not require flexible WDM channel spacing, and thus can utilize mature optical components.

4. The network of claim 1, wherein said network comprises no restriction for the independent and non-interfering OFDM signals generated from the same said transmitter rack with the same or overlapped RF spectrum.

5. The network of claim 1, wherein said network comprises a subcarrier position and quantity for each WDM channel are determined by a centralized controller based on a required bandwidth of each optical signal sent to each output port of said cyclic interleaver.

6. The network of claim 1, wherein said network comprises that an OFDM signal modulated on each WDM wavelength can have non-consecutive subcarriers and can have up to a maximum number of subcarriers allowed in said network.

7. The network of claim 1, wherein said network comprises having predetermined spectrum and subcarrier assignment across said network with there not being OFDM subcarrier contention among WDM signals received at each respective receiver input of said network.

8. The network of claim 1, wherein signals from each said transmitter rack can be switched to multiple racks simultaneously, and each receiver rack can receive signals switched from multiple racks simultaneously, therefore having multiple-in multiple-out feature.

9. The network of claim 1, wherein said transmitter rack comprises an OFDM modulator for converting signals from said transmitter TOR into up to N different streams of OFDM signals, one for each receiver rack, all signals going to the same receiver rack being modulated together into one OFDM signal.

10. The network of claim 9, wherein subcarrier location and quantity are determined by a centralized controller using appropriate scheduling process and wavelength and spectrum assignment process to avoid subcarrier contention at the destination node and to ensure best utilization of bandwidth resource.

11. The network of claim 9, wherein there is no subcarrier assignment restriction among said OFDM signals generated by said respective modulator, each of said generated OFDM signal being modulated onto a directly modulation laser DML to convert into said WDM optical signal, the N DMLs having different wavelengths, based on the wavelength assignment of the cyclic interleaver, said N WDM signals being combined using a WDM multiplexer or an optical coupler into a WDM output signal.

12. The network of claim 11, wherein said each DML is replaced by a laser source with continuous wave output and a modulator.

13. The network of claim 11, wherein said DML is replaced with tunable DMLs to select output wavelengths dynamically.

14. The network of claim 11, wherein a signal from each transmitter rack only needing to be switched to a smaller number of receiver racks at each point in time using tunable DMLs allows sharing of optical resources.

15. The network of claim 9, comprising tunable lasers and modulators to generate WDM OFDM signals.

16. A method by a MIMO-OFDM based flexible rate intra-data center network comprising:
receiving inter-rack traffic from transmitter racks coupled to transmitter top-of-the-rack TOR switches respectively coupled to transmitter;
converting by transmitters said inter-rack traffics to respective wavelength division multiplexing WDM optical signals containing K wavelengths with K being a number of receiver racks that said optical signals from said transmitter racks are to travel to;
receiving and routing by an cyclic interleaver said optical signals from said transmitter racks to output ports in a cyclic manner;
converting respective routed said optical signals from said cyclic interleaver into respective electrical signals;
demodulating OFDM formats from respective said converted optical signals containing signals for respective receiver racks through respective receiver TOR switches; and
switching with Cyclic Arrayed Waveguide Grating (CAWG), electrical OFDM and parallel signal detection with a single receiver.

\* \* \* \* \*